United States Patent
Busch-Sorensen et al.

(10) Patent No.: US 8,965,411 B1
(45) Date of Patent: Feb. 24, 2015

(54) POSITIONING SYSTEM WITH WIRELESS BEACONS THAT VARY TRANSMISSION POWER LEVELS

(71) Applicant: Cubic Corporation, San Diego, CA (US)

(72) Inventors: Thomas Busch-Sorensen, San Diego, CA (US); Pradip Mistry, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/524,595

(22) Filed: Oct. 27, 2014

Related U.S. Application Data (60) Provisional application No. 61/895,949, filed on Oct. 25, 2013.

(51) Int. Cl.
*H04W 24/00* (2009.01)
*H04W 4/02* (2009.01)
*H04W 24/08* (2009.01)
*G01C 21/34* (2006.01)

(52) U.S. Cl.
CPC .............. *H04W 4/023* (2013.01); *H04W 24/08* (2013.01); *G01C 21/34* (2013.01)
USPC ............... 455/456.3; 455/456.1; 455/500; 370/338; 370/328

(58) Field of Classification Search
CPC ..... H04W 24/00; H04W 4/023; H04W 24/08; G01C 21/34
USPC ............ 455/456.1, 456.3, 500; 370/328, 338
See application file for complete search history.

(56) References Cited

U.S. PATENT DOCUMENTS

| | | | | |
|---|---|---|---|---|
| 7,733,836 B2* | 6/2010 | Huseth | .......................... | 370/338 |
| 8,170,583 B2* | 5/2012 | Shkedi | ........................ | 455/456.1 |
| 2004/0266465 A1* | 12/2004 | Zegelin et al. | ................ | 455/500 |
| 2007/0178911 A1* | 8/2007 | Baumeister et al. | ....... | 455/456.1 |

* cited by examiner

*Primary Examiner* — Shahriar Behnamian
(74) *Attorney, Agent, or Firm* — Kilpatrick Townsend & Stockton LLP (57) ABSTRACT

Systems and techniques are presented for determining the position of a mobile device. The mobile device receives two beacon packets transmitted at varying power levels by a first beacon and determines received signal strength (RSS) levels for the beacon packets. A maximum distance and a minimum distance are determined based on the power levels that the packets were transmitted at and the RSS levels that the packets were received at. An area around the first beacon is determined based on the distance range. The mobile device receives two additional beacon packets transmitted at varying power levels by a second beacon and determines RSS levels for the beacon packets. A distance range between the mobile device and the second beacon is determined and an area around the second beacon is determined based on the distance range. The area of overlap between the beacons is where the mobile device is positioned.

19 Claims, 5 Drawing Sheets

POSITIONING SYSTEM WITH WIRELESS BEACONS THAT VARY TRANSMISSION POWER LEVELS

CROSS-REFERENCES TO RELATED APPLICATIONS

This application claims the benefit of U.S. Provisional Patent Application No. 61/895,949, filed Oct. 25, 2013, entitled "WIRELESS BEACON," the entire disclosure of which is hereby incorporated by reference for all purposes.

BACKGROUND

1. The Field of the Invention

The present invention generally relates to positioning systems. More specifically, the present invention relates to systems that use wireless beacons for positioning.

2. The Relevant Technology

Positioning systems use various technologies to determine the position of an object, such as a mobile device. One particular positioning technology uses wireless beacons to determine the position of the mobile device. The wireless beacons are placed at known locations around an area of interest and each beacon repeatedly transmits a wireless signal. When the mobile device detects the wireless signals transmitted by the beacons, the position of the mobile device relative to the beacons can be determined. For example, if the wireless signal of a beacon can only be detected at short ranges from the beacon, then it can be determined that the mobile device is close to the beacon when the mobile device detects the wireless signal.

One wireless communication technology that is particularly suitable for use in the transmission of wireless beacon signals is Bluetooth low energy (BLE). A BLE beacon consumes such low amounts of power that it can operate off of a single battery for over a year.

BRIEF SUMMARY

In one embodiment, a method for determining a position of a mobile device is presented. The method includes receiving a first beacon packet from a first wireless beacon. The first beacon packet includes power level data indicating that the first beacon packet was transmitted at a first power level. A first received signal strength (RSS) level is determined for the first beacon packet. The first RSS level indicates a received power level that the first beacon packet was received at. The method further includes receiving a second beacon packet from the first wireless beacon. The second beacon packet includes power level data indicating that the second beacon packet was transmitted at a second power level that is different than the first power level. A second RSS level is determined for the second beacon packet. A first distance range between the mobile device and the first wireless beacon is determined based on the first power level, the first RSS level, the second power level, and the second RSS level. The first distance range includes a maximum distance and a minimum distance. A first area around the first wireless beacon is determined based on the first distance range, such that a perimeter of the first area is defined by the maximum distance and the minimum distance.

The method further includes receiving a third beacon packet from a second wireless beacon. The third beacon packet includes power level data indicating that the third beacon packet was transmitted at a third power level. A third RSS level is determined for the third beacon packet. A fourth beacon packet is received from the second wireless beacon. The fourth beacon packet includes power level data indicating that the fourth beacon packet was transmitted at a fourth power level that is different than the third power level. A fourth RSS level is determined for the fourth beacon packet. The method further includes determining a second distance range between the mobile device and the second wireless beacon based on the third power level, the third RSS level, the fourth power level, and the fourth RSS level. A second area around the second wireless beacon is determined based on the second distance range. An overlap area where the first area around the first wireless beacon and the second area around the second wireless beacon overlap is determined and the position of the mobile device is determined to be within the overlap area.

In another embodiment, a system for determining a position of a mobile device is presented. The system includes a first wireless, a second wireless beacon, and an application executed by a mobile device. The first wireless beacon is configured to transmit a first beacon packet wirelessly at a first power level. The first beacon packet includes power level data indicating the first power level. The first wireless beacon is further configured to transmit a second beacon packet wirelessly at a second power level that is different than the first power level. The second wireless beacon is configured to transmit a third beacon packet wirelessly at a third power level and transmit a fourth beacon packet wirelessly at a fourth power level that is different than the third power level.

The application is configured to receive the first beacon packet from the first wireless beacon and determine a first RSS level for the first beacon packet. The first RSS level indicates a received power level that the first beacon packet was received at. The application is further configured to receive the second beacon packet from the first wireless beacon, determine a second RSS level for the second beacon packet, receive the third beacon packet from the second wireless beacon, determine a third RSS level for the third beacon packet, receive the fourth beacon packet from the second wireless beacon, and determine a fourth RSS level for the fourth beacon packet. The position of the mobile device is determined based on the first power level, the first RSS level, the second power level, the second RSS level, the third power level, the third RSS level, the fourth power level, and the fourth RSS level.

In a further embodiment, a method for determining a position of a mobile device is presented. The method includes receiving a first beacon packet from a first wireless beacon. The first beacon packet includes power level data indicating that the first beacon packet was transmitted at a first power level. A first RSS level is received for the first beacon packet. The first RSS level indicates a received power level that the first beacon packet was received at. The method further includes receiving a second beacon packet from the first wireless beacon. The second beacon packet includes power level data indicating that the second beacon packet was transmitted at a second power level that is different than the first power level. A second RSS level is received for the second beacon packet. A first distance parameter for the first wireless beacon is determined based on the first power level, the first RSS level, the second power level, and the second RSS level. A first area around the first wireless beacon is determined based on the first distance parameter.

The method further includes receiving a third beacon packet from a second wireless beacon. The third beacon packet includes power level data indicating that the third beacon packet was transmitted at a third power level. A third RSS level is received for the third beacon packet. A fourth beacon packet is received from the second wireless beacon. The fourth beacon packet includes power level data indicating that the fourth beacon packet was transmitted at a fourth power level that is different than the third power level. A fourth RSS level is received for the fourth beacon packet. The method further includes determining a second distance parameter for the second wireless beacon based on the third power level, the third RSS level, the fourth power level, and the fourth RSS level. A second area around the second wireless beacon is determined based on the second distance parameter. An overlap area where the first area around the first wireless beacon and the second area around the second wireless beacon overlap is determined and the position of the mobile device is determined to be within the overlap area.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bluetooth 4.0 added Bluetooth low energy (BLE), which introduced the advertising mode. It operates at 2.4 gigahertz (GHz) and the range can be over 100 feet. Broadcast messages are sent in one of three dedicated advertising channels and are repeated every 100 milliseconds (ms) to 10.24 seconds (configurable). A random delay of 0-10 ms is added before each message. A data packet is up to approximately 400 microseconds (us) long and can have 32 bytes of data.

BLE beacons are compact wireless modules that can be placed around an area of interest to implement a positioning system. Any mobile device with a BLE transceiver can receive the data packets and respond by transmitting data back to the beacons. The BLE beacons can also transmit the data packets in advertising mode, which requires no response from the mobile device that receives the packets.

By measuring the received signal strength (RSS) of a wireless signal carrying a data packet, a mobile device can estimate a distance to the beacon that transmitted the data packet. If the mobile device is in range to receive packets from more than one beacon, the position of the mobile device can be estimated using techniques such as triangulation or trilateration. However, traditional BLE receivers can only detect RSS in three levels and the position is determined based on only one of four measured distances to each beacon (distances for no reception and RSS levels one, two, and three). Thus, the determined position for the mobile device can be imprecise and can cover a large area of possible positions.

Embodiments of the present invention use the programmable power level in a BLE beacon transmitter to increase the accuracy of determined positions. By varying the transmission power level of the BLE beacon, the number of distance measurements can be increased by more than an order of magnitude. A mobile device receives two or more beacon packets transmitted at varying power levels by a beacon and determines a maximum distance and a minimum distance based on the power levels that the packets were transmitted at and the RSS levels that the packets were received at. An area around the beacon can be determined based on the distance range. This is repeated for two or more beacons and the area of overlap between the beacons is where the mobile device is positioned.

Figure 1:
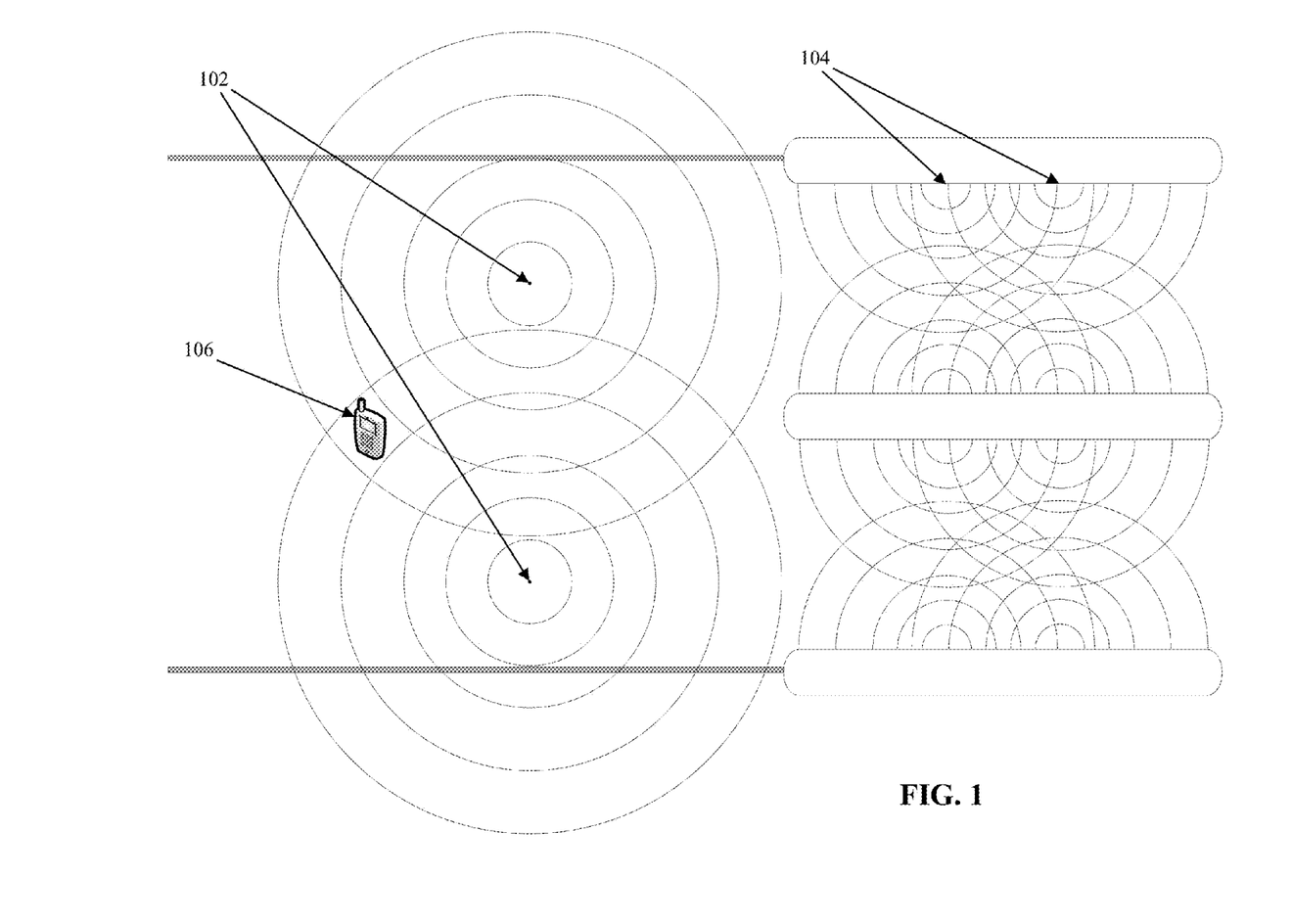
FIG. 1 is an example environment within which one embodiment of a positioning system with wireless beacons that vary transmission power levels can be implemented.

FIG. 1 is an example environment within which one embodiment of a positioning system with wireless beacons that vary transmission power levels can be implemented. The environment depicted in this figure represents a gate or entrance to a restricted area that requires authorization for access. For example, the depicted environment can be the ticketing and entrance area for a public transit system, such as a subway or bus transit system, a stadium or theme park, or any other setting in which knowing the location of an individual and/or wireless enabled device can add value. For transit systems, there are a number possibilities in how embodiments of the current invention can be used. One such possibility is to locate beacons in stations or buses so that transit system devices are alerted when passengers/users enter. The passengers can also be alerted that the system is aware of their presence via an application executed by their mobile device. This can enhance and speed up the fare payment process without the need for passengers to physically interact with a device, making the process much more user friendly.

Embodiments may be employed to determine a passenger's position with enough accuracy to determine entry, location on a bus, and/or process fare payment. The position information can also be used to deliver relevant information about the station or trip, or tag some piece of information about the passenger's trip to their choice of social media feed. Embodiment utilizing a user's mobile device (e.g., smart phone) may further make use of a mobile app, allowing the app to authorize and automatically perform quick reloads/purchases etc. For example, a passenger can be automatically ticketed when the passenger enters a station or is on-board a bus. Alternatively, the passenger can use the app on the mobile device to authorize fare payments, which is easier and quicker than standing in a line and paying for travel service by presenting a card or a mobile device to a reader.

In this embodiment, the positioning system includes two wireless beacons 102 placed just before the entrance aisles. Wireless beacons 102 are equipped with omnidirectional antennas and the wireless signals from beacons 102 cover a relatively large area. While only two beacons 102 are depicted in FIG. 1 for the sake of clarity, the positioning system can include any number beacons 102. The system also includes eight beacons 104 placed at the entrance aisles, although only two of the eight beacons are labeled in FIG. 1 for the sake of clarity. In this embodiment, radio frequency (RF) blocking/shielding plates are placed behind beacons 104 so that the wireless signals generated by beacons 104 have limited directions of dispersion. In other embodiments, beacons 104 can be equipped with directional antennas that disperse wireless signals in a narrow beam or dipole antennas that disperse wireless signals in a figure-eight pattern. Beacons 102 and 104 can be BLE beacons or use other wireless communication technologies such as Wi-Fi. In one embodiment, beacons 102 and 104 are BLE beacons that transmit beacon packets in advertising mode and use a traditional (non-advertising mode) Bluetooth connection for other types of data exchange, such as time synchronization.

The circles/semi-circles around each beacon represents measured distances for different combinations of transmission power levels and RSS levels. For example, the smallest circle around beacon 102 corresponds to the maximum distance from the beacon 102 at which a beacon packet transmitted at the lowest power level can be received by a mobile device at the highest RSS level. The largest circle around beacon 102 corresponds to the maximum distance from the beacon 102 at which a beacon packet transmitted at the highest power level can be received by a mobile device at the lowest RSS level. If a mobile device is positioned outside of the largest circle around a beacon 102, the mobile device will not be able to receive any beacon packets from that beacon 102.

Mobile device 106 can determine its position using the beacon packets that are transmitted by beacons 102. Each beacon packet includes the transmission power level that the beacon packet was transmitted at. Each beacon packet can also include a unique identification of the beacon that transmitted the beacon packet or coordinates of the location of the transmitting beacon. Additionally, to prevent pranksters and hackers from sabotaging the positioning system, the beacon packets can be encrypted by a message authentication code (MAC) and each beacon packet can include the MAC. The encryption can be a public key encryption so that everyone can verify the authenticity of the beacon packets, but only the beacons can generate the encrypted beacon packets. To prevent re-play attacks, the beacon packets can further include time and date stamps, so that captured messages are not valid if retransmitted at a later time.

In one embodiment, mobile device 106 executes an application to determine the position of mobile device 106. The application can have a map of the beacon locations and can use the unique identification included in beacon packets to locate the transmitting beacon and determine the position of mobile device 106 relative to the beacon. The map can be dynamically updated based on the current position of the mobile device. In another embodiment, mobile device 106 can transmit the necessary data, such as the received beacon packets and corresponding RSS levels, to a computer server system and the computer server system can determine the position of mobile device 106. Mobile device 106 can include one wireless transceiver, such as a BLE transceiver, for receiving beacon packets and another wireless transceiver, such as a Wi-Fi or 3G/4G transceiver, for communicating with the computer server system.

In this example environment, mobile device 106 is positioned between the largest circle and the second largest circle from each beacon 102. Mobile device 106 receives beacon packets transmitted at varying power levels from each beacon 102. Based on the transmission power levels and RSS levels of the received beacon packets, mobile device 106 can determine that it is positioned in a ring shaped area between the largest circle and the second largest circle from each beacon 102. Mobile device 106 can then determine an overlapping area between the ring shaped areas from each beacon 102 to determine the position of the mobile device. Additional details for determining the position of the mobile device are described herein below with reference to FIGS. 2-4.

Figure 2:
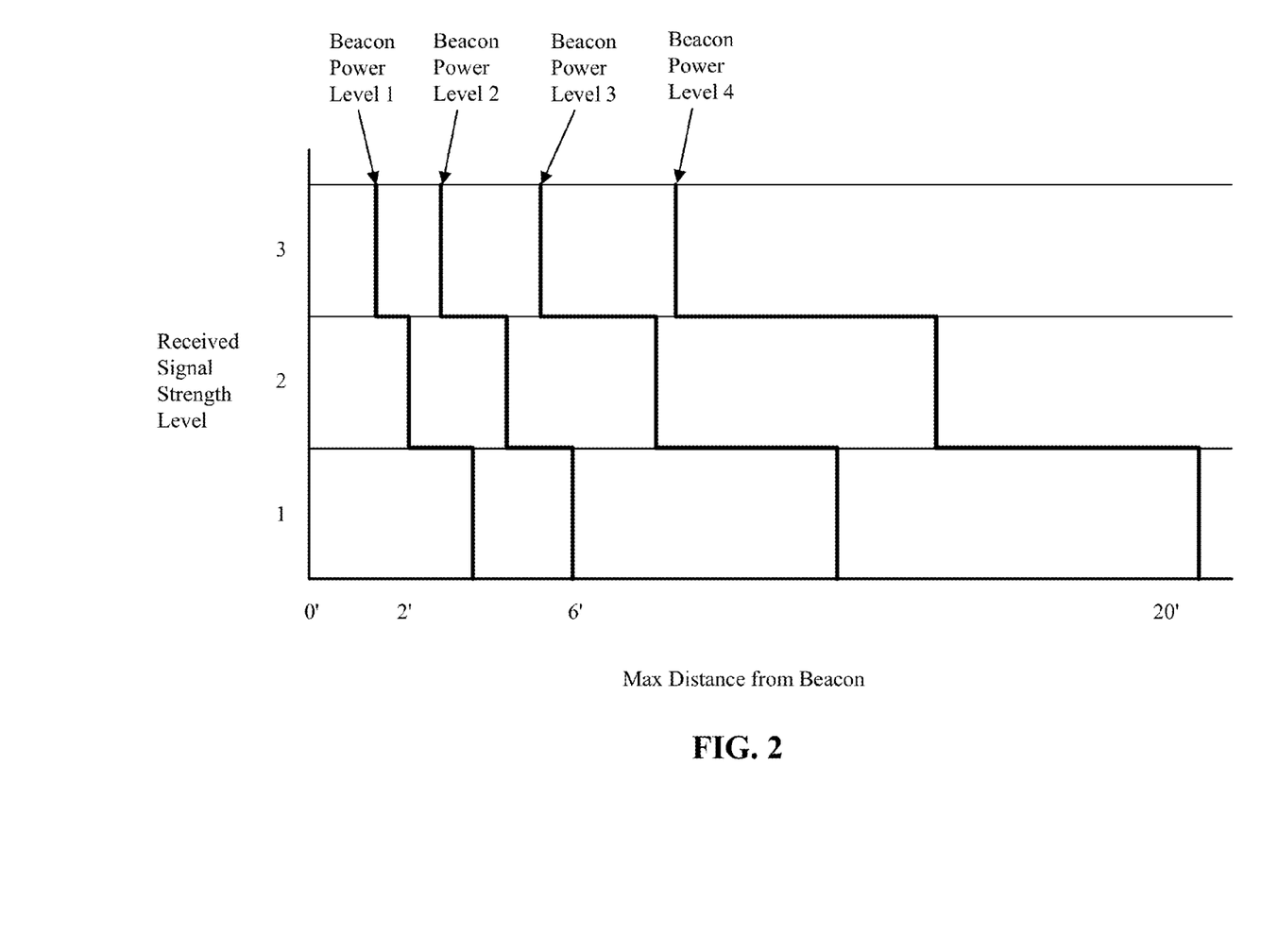
FIG. 2 is a graph of example distance measurements for one embodiment of a wireless beacon that varies transmission power levels.

FIG. 2 is a graph of example distance measurements for one embodiment of a wireless beacon that varies transmission power levels. The x-axis of the graph corresponds to the maximum distance from the beacon measured in feet. The y-axis of the graph corresponds to RSS levels that are detected by the mobile device when receiving a beacon packet. Each continuous line on the graph corresponds to a transmission power level that a beacon packet is transmitted at by a beacon. Thus, each vertical line on the graph represents the maximum distance at which a mobile device can receive a beacon packet for the corresponding transmission power level and RSS level. For example, if a beacon transmits a beacon packet at power level one, the maximum distance from the beacon at which a mobile device can receive the beacon packet at RSS level two is two feet. If the mobile device is three feet away from the beacon, the mobile device will detect an RSS level of one when receiving the beacon packet transmitted at power level one.

By receiving beacon packets that are transmitted at different power levels, the mobile device can determine a maximum distance and a minimum distance from the beacon that the mobile device can be positioned at. The maximum distance corresponds to the vertical line that is farthest to the left side of the graph (closest distance from the beacon) for power levels and RSS levels of received beacon packets. The minimum distance corresponds to the vertical line that is farthest to the right side of the graph (farthest distance from the beacon) for power levels and RSS levels of beacon packets that were not received by the mobile device. For example, a mobile device at a distance of seven feet from the beacon can detect an RSS level of two when receiving a beacon packet transmitted at power level three. Thus, the mobile device can determine that the maximum distance from the beacon is about eight feet. The mobile device will not be able to receive any beacon packets transmitted at power level two, thus the minimum distance from the beacon is six feet.

In one embodiment, a lookup table is used to determine the position of the mobile device. The lookup table can include typical transmission power levels and RSS levels in each area or distances from each beacon sorted by transmission power levels and RSS levels. There can also be more than one version of the lookup table. For example, multiple lookup tables can be used to adjust the positioning system based on the number of people in the area. People can cause attenuation, reflection, and blocking of the wireless beacon signals. Thus, there can be one version of the lookup table for rush-hour time periods when there are a lot of people and a different version of the lookup table for off peak time periods. Table I below is an example lookup table for one beacon that includes distances sorted by transmission power levels and RSS levels.

TABLE I

| | Distance in Feet | | | |
| --- | --- | --- | --- | --- |
| | RSS Level 0 | RSS Level 1 | RSS Level 2 | RSS Level 3 |
| Tx Power Level 1 | >2 | 1.5 | 0.7 | 0.4 |
| Tx Power Level 2 | >4 | 3.5 | 1.8 | 0.9 |
| Tx Power Level 3 | >9 | 7 | 3.9 | 2 |
| Tx Power Level 4 | >30 | 21 | 8.5 | 4.1 |

Figure 3:
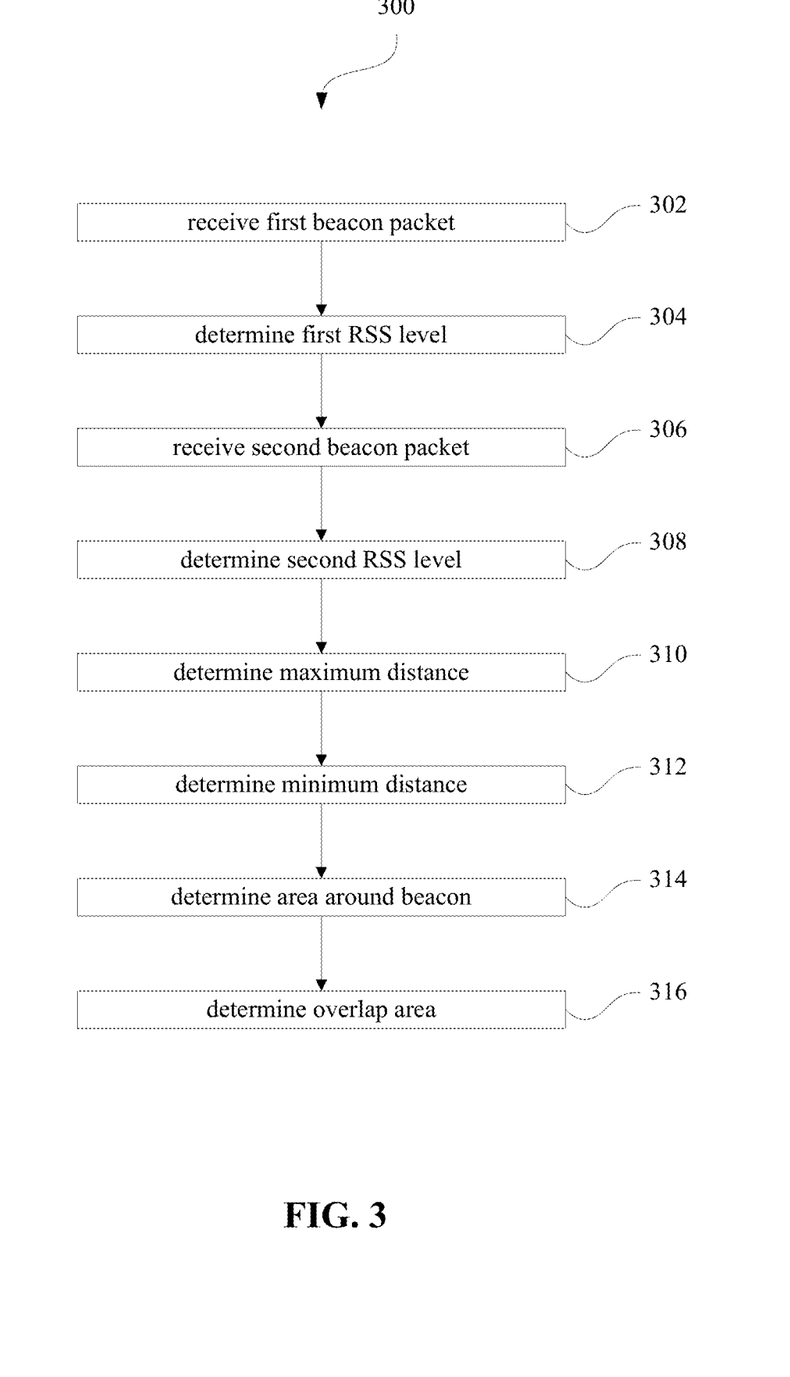
FIG. 3 is a flowchart of one embodiment of a process for determining the position of a mobile device using wireless beacons that vary transmission power levels.

FIG. 3 is a flowchart of one embodiment of a process 300 for determining the position of a mobile device using wireless beacons that vary transmission power levels. Process 300 can be performed by the mobile device or a computer server system. Process 300 starts at block 302, wherein a first beacon packet is received. A first RSS level is determined for the first beacon packet at block 304. A second beacon packet is received at block 306 and a second RSS level is determined for the second beacon packet at block 308.

At blocks 310 and 312, a maximum distance and a minimum distance from the beacon that transmitted the beacon packets are determined based on the transmission power levels and RSS levels of the first and second beacon packets. At block 314, an area around the transmitting beacon is determined. The maximum distance determined in block 310 and the minimum distance determined in block 312 define perimeters for the area around the transmitting beacon. Blocks 302-314 are repeated for each beacon that the mobile device is within range of receiving beacon packets from. An overlap area is determined at block 316 that corresponds to where the areas around each beacon determined in block 314 overlap. The position of the mobile device is within the overlap area.

Figure 4:
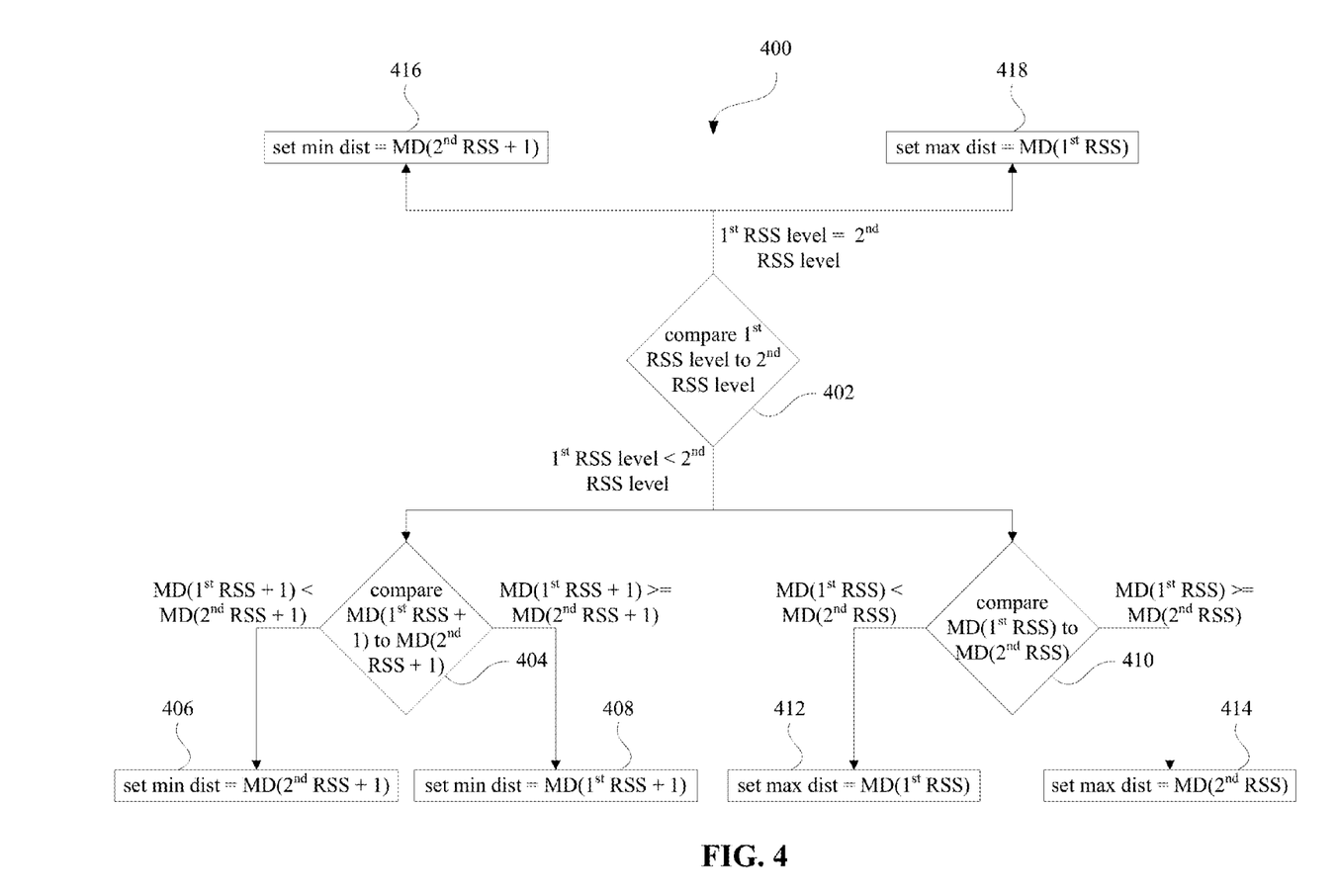
FIG. 4 is a flowchart of one embodiment of a process for determining the distance range from a wireless beacon that varies transmission power levels.

FIG. 4 is a flowchart of one embodiment of a process 400 for determining the distance range from a wireless beacon that varies transmission power levels. Process 400 can be performed by a mobile device or a computer server system. Process 400 is performed after receiving a first beacon packet transmitted at a first power level and a second beacon packet transmitted at a second power level that is different than the first power level. A first RSS level for the first beacon packet and a second RSS level for the second beacon packet have also been determined before process 400 is performed. It should be noted that process 400 is only an example process for determining the distance range in some situations. Depending on the configuration of the positioning system and beacons, other methods may be more suitable for determining the distance range, such as the one described herein above with reference to FIG. 2.

Process 400 starts at block 402, wherein the first RSS level is compared with the second RSS level. In this embodiment, it is assumed that the first power level for transmission of the first beacon packet is lower than the second power level for transmission of the second beacon packet. Thus, the first RSS level can only be less than or equal to the second RSS level. If the first RSS level is less than the second RSS level, process 400 goes to block 404 to determine the minimum distance for the distance range and 410 to determine the maximum distance for the distance range.

At block 404, the maximum distance corresponding to the first power level and one RSS level above the first RSS level (i.e., maximum distance for receiving the first beacon packet at one RSS level higher) is compared with the maximum distance corresponding to the second power level and one RSS level above the second RSS level (i.e., maximum distance for receiving the second beacon packet at one RSS level higher). If the maximum distance for receiving the first beacon packet at one RSS level higher is less than the maximum distance for receiving the second beacon packet at one RSS level higher, the maximum distance for receiving the second beacon packet at one RSS level higher is set as the minimum distance for the distance range (block 406). If the maximum distance for receiving the first beacon packet at one RSS level higher is greater than or equal to the maximum distance for receiving the second beacon packet at one RSS level higher, the maximum distance for receiving the first beacon packet at one RSS level higher is set as the minimum distance for the distance range (block 408).

At block 410, the maximum distance corresponding to the first power level and the first RSS level (i.e., maximum distance for receiving the first beacon packet at the first RSS level) is compared with the maximum distance corresponding to the second power level and the second RSS level (i.e., maximum distance for receiving the second beacon packet at the second RSS level). If the maximum distance corresponding to the first power level and the first RSS level is less than the maximum distance corresponding to the second power level and the second RSS level, the maximum distance for corresponding to the first power level and the first RSS level is set as the maximum distance for the distance range (block 412). If the maximum distance corresponding to the first power level and the first RSS level is greater than or equal to the maximum distance corresponding to the second power level and the second RSS level, the maximum distance corresponding to the second power level and the second RSS level is set as the maximum distance for the distance range (block 414).

Referring back to block 402, if the first RSS level is equal to the second RSS level, blocks 416 and 418 are performed to set the minimum distance and maximum distance for the distance range. At block 416, the maximum distance for receiving the second beacon packet at one RSS level higher is set as the minimum distance for the distance range. At block 418, the maximum distance corresponding to the first power level and the first RSS level is set as the maximum distance for the distance range.

Figure 5:
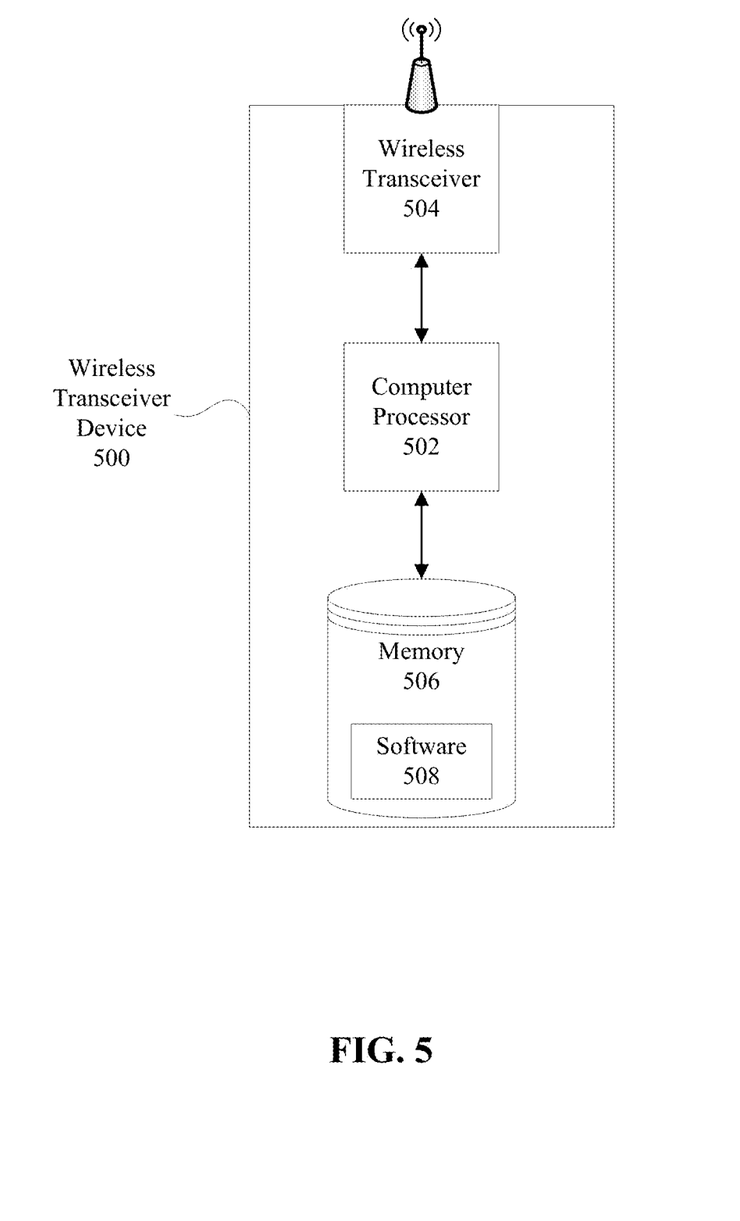
FIG. 5 is a block diagram of one embodiment of a wireless transceiver device that can be used in a positioning system.

FIG. 5 is a block diagram of one embodiment of a wireless transceiver device 500 that can be used in a positioning system. Wireless transceiver device 500 can be a mobile device or a wireless beacon. Wireless transceiver device 500 includes a computer processor 502, a wireless transceiver 504, and a memory module 506. Memory module 506 can be any non-transitory machine-readable media, such as optical disks or flash memory devices. Software 508 is stored in memory module 506 and provides instructions to computer processor 502 according to any of the embodiments described herein.

Computer processor 502 utilizes wireless transceiver 504 to communicate, by transmitting and receiving data packets, with other wireless transceiver devices. It will be understood that the wireless transceiver device 500 can include additional components not shown in the figure. For example, wireless transceiver device 500 can include additional wireless transceivers that utilize different technologies for wireless communication or the different technologies can be combined into a single wireless transceiver. Different wireless communication technologies include Bluetooth, BLE, Wi-Fi, near field communication (NFC), and 3G/4G mobile communication. Additionally or alternatively, different embodiments may combine, separate, omit, and/or rearrange the components shown in FIG. 5.

Although embodiments provided herein describe the use of Bluetooth, and in particular BLE, embodiments are not so limited. Concepts provided herein may be extended to other wireless technologies. Furthermore, embodiments herein can be implemented in a wide range of wireless devices and/or work with a wide range of software applications and/or operating systems.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for determining a position of a mobile device, the method comprising:
receiving a first beacon packet from a first wireless beacon, the first beacon packet including power level data indicating that the first beacon packet was transmitted at a first power level;
determining a first received signal strength (RSS) level for the first beacon packet, the first RSS level indicating a received power level that the first beacon packet was received at;
receiving a second beacon packet from the first wireless beacon, the second beacon packet including power level data indicating that the second beacon packet was transmitted at a second power level that is different than the first power level;
determining a second RSS level for the second beacon packet;
determining a first distance range between the mobile device and the first wireless beacon based on the first power level, the first RSS level, the second power level, and the second RSS level, the first distance range including a maximum distance and a minimum distance;
determining a first area around the first wireless beacon based on the first distance range, such that a perimeter of the first area is defined by the maximum distance and the minimum distance;
receiving a third beacon packet from a second wireless beacon, the third beacon packet including power level data indicating that the third beacon packet was transmitted at a third power level;
determining a third RSS level for the third beacon packet;
receiving a fourth beacon packet from the second wireless beacon, the fourth beacon packet including power level data indicating that the fourth beacon packet was transmitted at a fourth power level that is different than the third power level;
determining a fourth RSS level for the fourth beacon packet;
determining a second distance range between the mobile device and the second wireless beacon based on the third power level, the third RSS level, the fourth power level, and the fourth RSS level;
determining a second area around the second wireless beacon based on the second distance range;
determining an overlap area, the overlap area being where the first area around the first wireless beacon and the second area around the second wireless beacon overlap; and
determining that the position of the mobile device is within the overlap area.

2. The method of claim 1, further comprising:
determining that the first power level is less than the second power level;
determining that the first RSS level is equal to the second RSS level;
determining the maximum distance of the first distance range to be a first maximum distance for transmission at the first power level and receiving at the first RSS level; and
determining the minimum distance of the first distance range to be a second maximum distance for transmission at the second power level and receiving at a RSS level that is one level greater than the second RSS level.

3. The method of claim 1, further comprising:
conducting a transaction based on the position of the mobile device.

4. The method of claim 3, wherein conducting the transaction includes debiting an account and granting access to a public transit system.

5. The method of claim 1, further comprising:
identifying a location of the first wireless beacon based on a unique identifier of the first wireless beacon, wherein the first beacon packet further includes the unique identifier of the first wireless beacon.

6. The method of claim 1, further comprising:
identifying the maximum distance in a lookup table based on the first power level and the first RSS level; and
identifying the minimum distance in the lookup table based on the second power level and the second RSS level.

7. The method of claim 6, further comprising:
identifying the lookup table from a plurality of lookup tables based on a time of day.

8. A system for determining a position of a mobile device, the system comprising:
a first wireless beacon configured to:
transmit a first beacon packet wirelessly at a first power level, the first beacon packet including power level data indicating the first power level, and
transmit a second beacon packet wirelessly at a second power level that is different than the first power level;
a second wireless beacon configured to:
transmit a third beacon packet wirelessly at a third power level, and
transmit a fourth beacon packet wirelessly at a fourth power level that is different than the third power level;
an application executed by the mobile device, the application being configured to:
receive the first beacon packet from the first wireless beacon,
determine a first RSS level for the first beacon packet, the first RSS level indicating a received power level that the first beacon packet was received at,
receive the second beacon packet from the first wireless beacon,
determine a second RSS level for the second beacon packet,
receive the third beacon packet from the second wireless beacon,
determine a third RSS level for the third beacon packet,
receive the fourth beacon packet from the second wireless beacon,
determine a fourth RSS level for the fourth beacon packet, and
transmit to a computer server system the first power level, the first RSS level, the second power level, the second RSS level, the third power level, the third RSS level, the fourth power level, and the fourth RSS level; and
the computer server system being configured to:
determine a first distance range between the mobile device and the first wireless beacon based on the first power level, the first RSS level, the second power level, and the second RSS level, the first distance range including a maximum distance and a minimum distance,
determine a first area around the first wireless beacon based on the first distance range, such that a perimeter of the first area is defined by the maximum distance and the minimum distance,
determine a second distance range between the mobile device and the second wireless beacon based on the third power level, the third RSS level, the fourth power level, and the fourth RSS level,
determine a second area around the second wireless beacon based on the second distance range,
determine an overlap area, the overlap area being where the first area around the first wireless beacon and the second area around the second wireless beacon overlap, and determine that the position of the mobile device is within the overlap area.

9. The system of claim 8, wherein the first wireless beacon and the second wireless beacon are located around a perimeter of an area of interest.

10. The system of claim 8, wherein the first wireless beacon is further configured to alternate between a set of relatively high power levels and a set of relatively low power levels for transmission of beacon packets, each power level in the set of relatively high power levels being greater than each power level in the set of relatively low power levels.

11. The system of claim 8, wherein the mobile device is configured to detect only three distinct RSS levels.

12. The system of claim 8, wherein the first wireless beacon transmits beacon packets via a dipole antenna.

13. The system of claim 8, wherein the first wireless beacon transmits beacon packets via a directional antenna.

14. A method for determining a position of a mobile device, the method comprising:
receiving a first beacon packet from a first wireless beacon, the first beacon packet including power level data indicating that the first beacon packet was transmitted at a first power level;
receiving a first RSS level for the first beacon packet, the first RSS level indicating a received power level that the first beacon packet was received at;
receiving a second beacon packet from the first wireless beacon, the second beacon packet including power level data indicating that the second beacon packet was transmitted at a second power level that is different than the first power level;
receiving a second RSS level for the second beacon packet;
determining a first distance range for the first wireless beacon based on the first power level, the first RSS level, the second power level, and the second RSS level;
determining a first area around the first wireless beacon based on the first distance range;
receiving a third beacon packet from a second wireless beacon, the third beacon packet including power level data indicating that the third beacon packet was transmitted at a third power level;
receiving a third RSS level for the third beacon packet;
receiving a fourth beacon packet from the second wireless beacon, the fourth beacon packet including power level data indicating that the fourth beacon packet was transmitted at a fourth power level that is different than the third power level;
receiving a fourth RSS level for the fourth beacon packet;
determining a second distance range for the second wireless beacon based on the third power level, the third RSS level, the fourth power level, and the fourth RSS level;
determining a second area around the second wireless beacon based on the second distance range;
determining an overlap area, the overlap area being where the first area around the first wireless beacon and the second area around the second wireless beacon overlap; and
determining that the position of the mobile device is within the overlap area.

15. The method of claim 14, further comprising:
determining a transit route based on the position of the mobile device.

16. The method of claim 15, further comprising:
determining navigational directions to a boarding area of the transit route from the position of the mobile device.

17. The method of claim 14, further comprising:
authenticating that the first beacon packet is transmitted by the first wireless beacon based on a message authentication code,
wherein the first beacon packet further includes the message authentication code.

18. The method of claim 14, wherein the first beacon packet further includes location data indicating a coordinate of the first wireless beacon.

19. The method of claim 14, wherein the first beacon packet further includes a time of day and a date.

* * * * *